May 7, 1946.  E. BODMER  2,399,621
DEVICE FOR AUTOMATIC LATHES
Filed Aug. 26, 1943  5 Sheets-Sheet 4

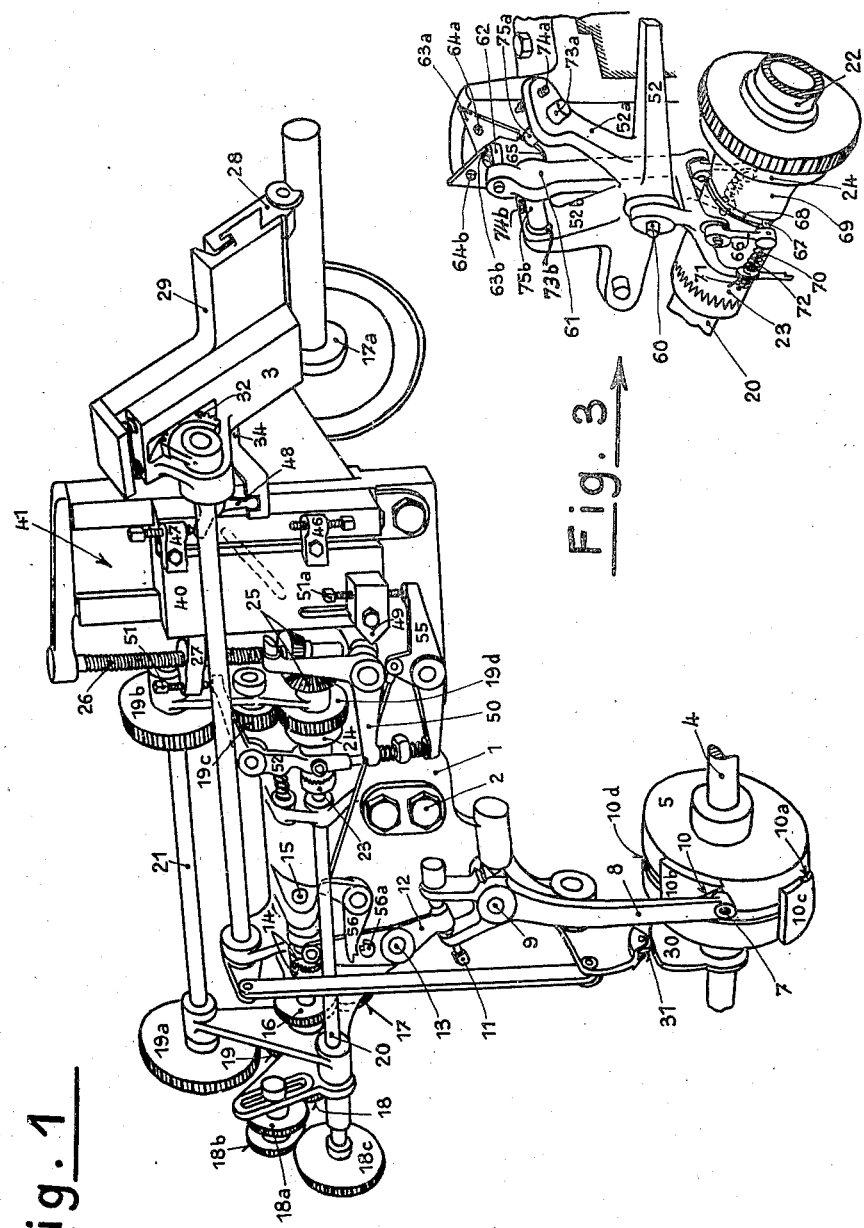

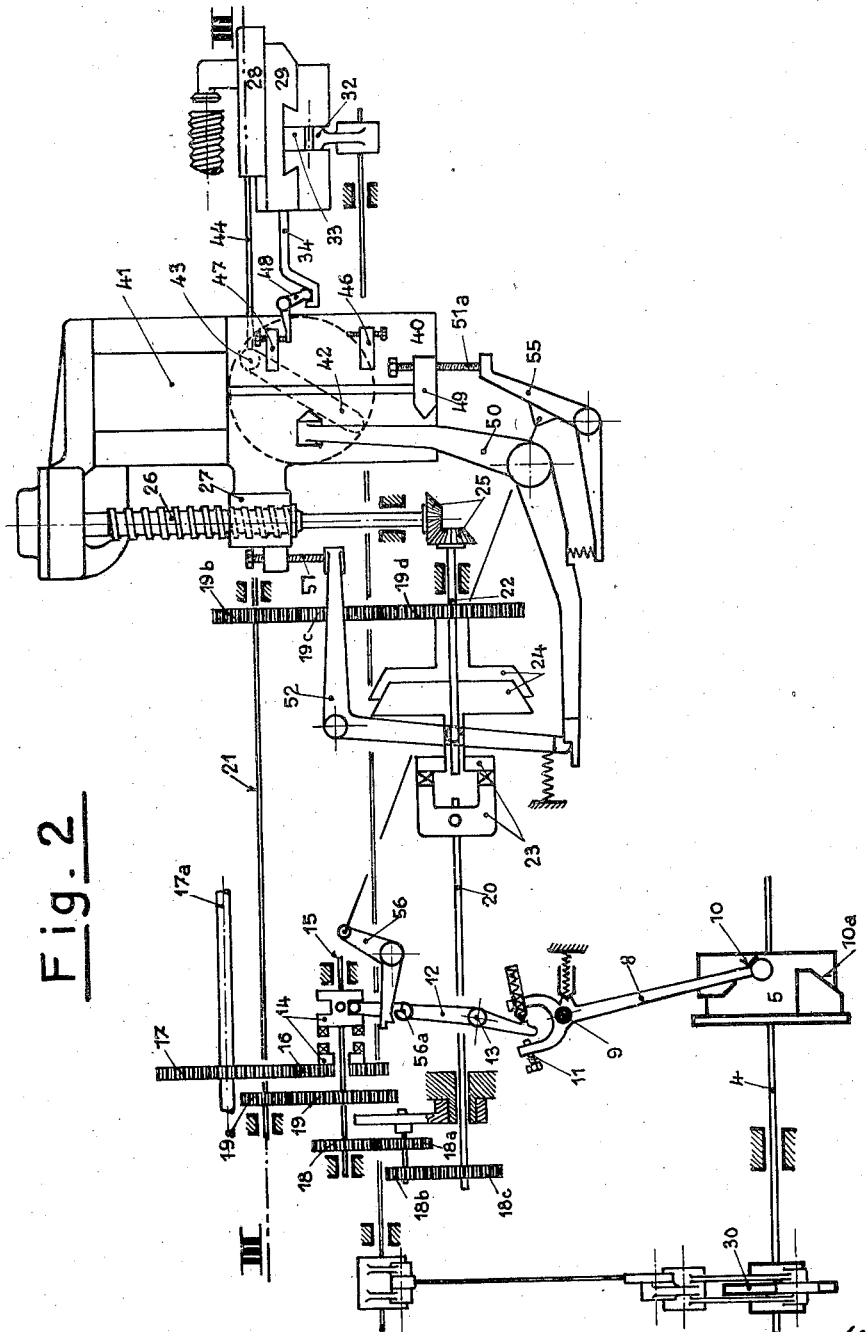

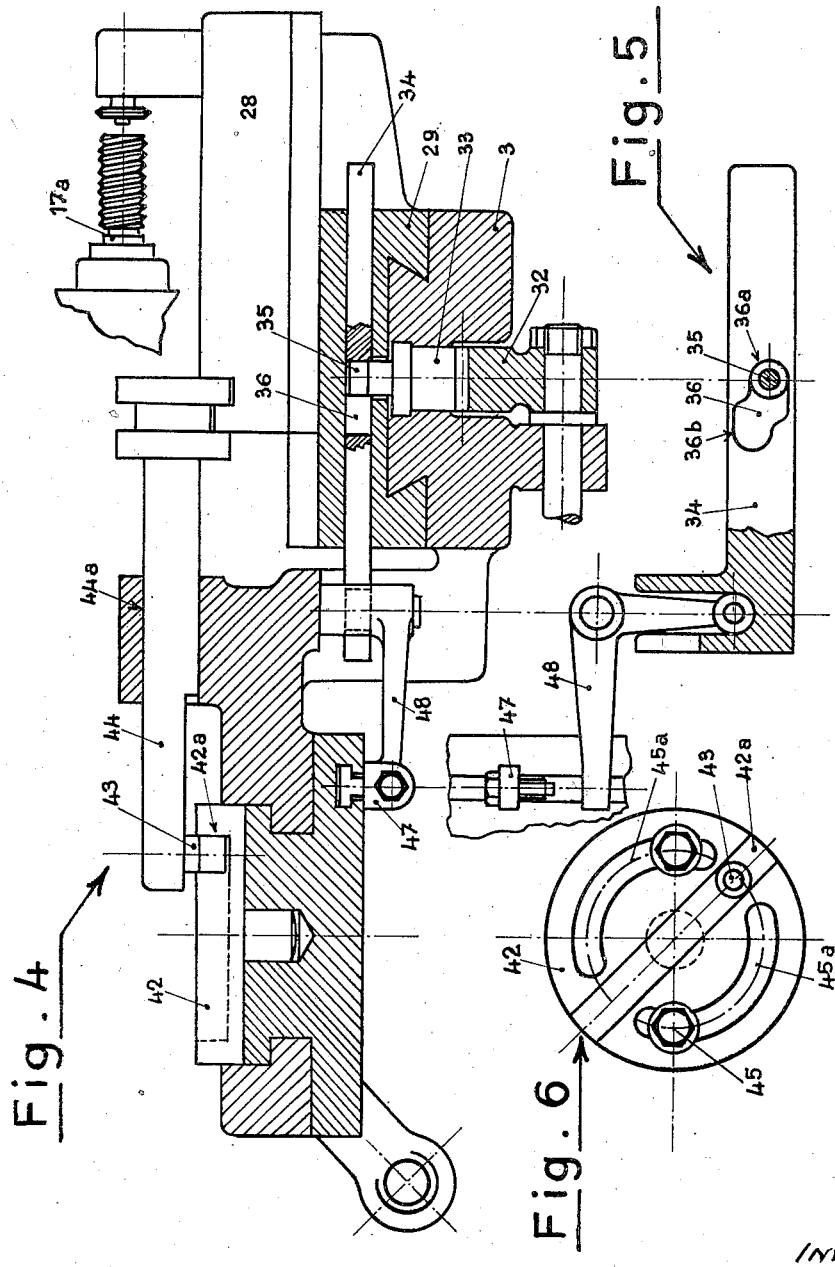

INVENTOR
ERNEST BODMER,
BY William Stirn Graff
ATTORNEY

Patented May 7, 1946

2,399,621

UNITED STATES PATENT OFFICE 2,399,621

DEVICE FOR AUTOMATIC LATHES

Ernest Bodmer, Geneva, Switzerland

Application August 26, 1943, Serial No. 500,128
In Switzerland June 20, 1942

7 Claims. (Cl. 10—101)

All manufacturers of automatic or semi-automatic lathes have found it advisable to fit their lathes with auxiliary devices to cut internal or external screw threads by means of a tool fixed on one of the tool holders of the lathe.

These devices use, generally speaking, either the lead-screw of one of the slides of the tool-post, or a special lead-screw—in case the lathe does not embody a lead-screw—for controlling the longitudinal motions of one of the tool holders of the lathe.

A cam arranged on the main cam shaft controls the work starting position of the tool holder, and, in the case of a screw thread cutting device, also the feed in depth of the tool at each run. In devices which are controlled by the slide bearing the tool-holder, or by an element in mesh with the lead screw, such controls cause the withdrawal of the tool at the end of each run, the running back of the slide to its work starting position, the positioning of the cutting tool and the longitudinal feed of the latter.

The tool holders are provided with means which become effective when the tool-holders reach the end-point on the last run to cause the withdrawal of the tool, the withdrawal of the tool-holder and the stopping of the device.

A cam is arranged on the main cam shaft in order to effect the operation of a clutch which controls the starting of the device at the required moment of the manufacturing process.

Due to a series of change wheels arranged between the spindle bearing the workpiece on which the screw-thread is to be cut and the shaft bearing the lead screw, it is possible to cut practically all type of threads (Withworth or metric) by means of one single lead screw. However, whatever may be the adopted pitch of the lead screw, all the screw threads cannot be cut with accuracy, due to the fact that the series of variable speed gears do not provide all the necessary transmission ratios between the spindle and the lead screw. It is therefore quite indispensable to provide several sets of lead screws, as well as special variable speed gears in order to permit to cut accurately all kinds of screw threads. Besides the fact that these lead screws are scarce, the change requires a rather long time. Since the necessary time for changing the lead screw is unproductive, it is highly detrimental to the output of the lathe.

Further, when using a lead screw, the return of the slide bearing the tool-post is very slow, due to the fact that the return motion is operated by the same elements which control the working feed, that is, through the operation of the variable speed gears, the spindle revolves in the reverse direction. Thus production is seriously limited as the return motion of the slide is unproductive.

In order to obviate this inconvenience, a "master screw" with movable socket, has been adopted in several cases. In these devices the socket meshes with the screw thread of the "master screw" in order to control the feed of the tool. At the end of the working stroke, the socket is freed and the longitudinal slide is drawn back by a spring.

These devices are quite unsatisfactory as after the return of the slide to its starting position, the socket meshes with the screw thread of the "master screw" and it is therefore necessary that the pitch of the "master screw" corresponds to a simple fraction or to a multiple of the pitch to be cut.

Hence, such devices necessitate a special "master screw" for each pitch to be cut.

The object of the present invention is to provide an attachment for automatic lathes which eliminates the above mentioned inconveniences, inasmuch as it is fitted with adjustable transmission elements disposed between a tool holder, and an element controlling the longitudinal displacements of the tool-holder, the adjustable transmission element enabling one to infinitely adjust or change the transmission ratio of the motions between said controlling element and the tool-holder.

The drawings annexed hereto disclose two embodiments of this invention in which:

Fig. 1 is a perspective view of this invention.

Fig. 2 is a diagrammatic representation of the device shown in Fig. 1.

Fig. 3 is a detailed view of a snap actuation for positive engagement of the reversing clutches.

Fig. 4 is a detailed partial sectional view taken on the line III—III of Fig. 2 and the line C—C of Fig. 8.

Fig. 5 is a detail view of some of the elements of this device.

Fig. 6 is a front elevation of the guide.

Figure 7:
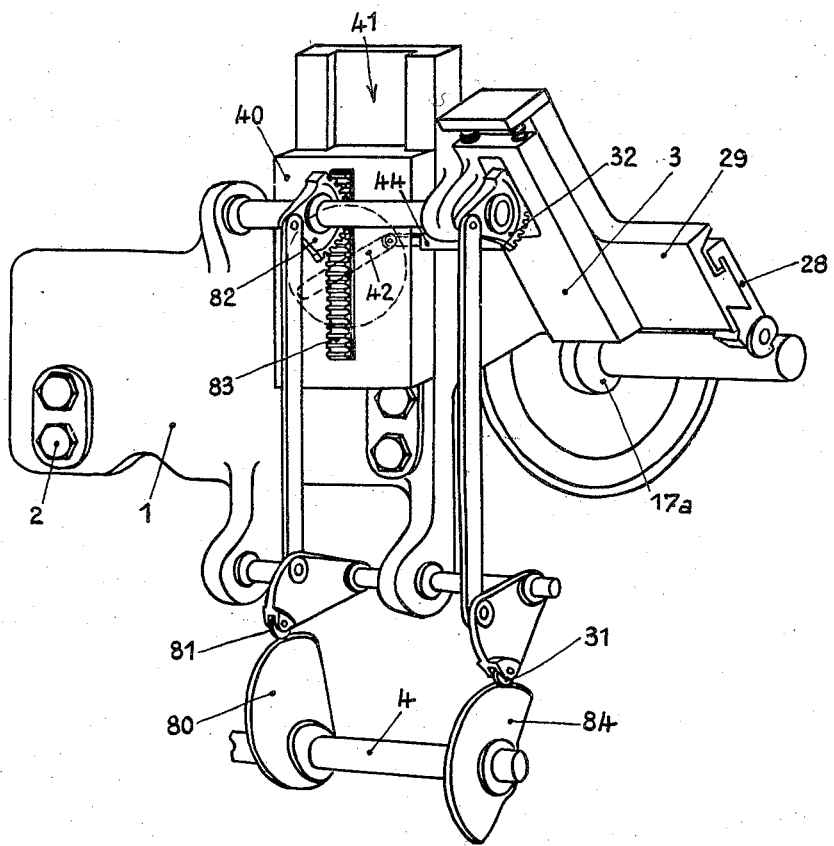
Fig. 7 is a perspective view of a modification of the invention for cutting off.

In the embodiment illustrated in Figs. 1 and 2, the device is arranged as a thread cutting contrivance. It has a frame 1 intended to be secured to the bed of the lathe by means of fastening elements 2. This frame is equipped with a support 3 for a tool-holder mounted on cross-slides, as well as the necessary elements for controlling the motion of the tool-holder for cutting screw threads. The starting of the screw cutting operation is carried out by the rotation of a cam 5 fixedly mounted on a cam shaft 4 of the lathe.

A pivoted lever 8 is provided with a finger 7 and is so positioned as to engage under certain conditions, either the cam face 10 or 10a, which are respectively faces of adjustable dogs 10b and 10c. The position of the cam faces 10 and 10a may be varied by changing the position of the adjustable dogs 10b and 10c. The position of the dogs on the cam 5 is determined by conventional practices.

When commencing the screw-thread cut, the cam face 10 engages the finger 7 and moves the lever 8 in a clockwise direction about the pivot 9. A stop element 11, adjustable in its position, is fastened on one of the arms of the lever 8 and acts on a lever 12 pivoted at 13 on the frame 1. The rocking of this lever 12 effects an engagement of both parts of a clutch 14, one part of which is fixed on a shaft 15 whereas the other part is fixed to a gear wheel 16 which is freely rotatable on the shaft 15. The gear wheel 16 meshes with a pinion wheel 17 fixed on the work spindle 17a of the lathe. On the shaft 15 there are also fixedly mounted two gear wheels 18 and 19. The gear 18 drives a set of interchangeable gear wheels 18a, 18b, 18c, while the gear 19 meshes with a toothed gear 19a fixed on a shaft 21. The gear wheel 18c is fastened on a shaft 20 bearing one part of a coupling 23. The shaft 21 bears a second gear wheel 19b, which engages the gear wheel 19c which in turn meshes with a gear wheel 19d mounted loosely on a shaft 22. The sets of gear wheels 18 and 19 are arranged in such a way that the gear wheel 19d revolves in a direction reverse to that of the gear wheel 18c.

The shaft 22 bears both female parts of two clutches 23 and 24, the male parts being respectively fastened on the shaft 20 and on the gear wheel 19d, so that, by operating one of these two clutches the shaft 22 can be controlled as required; that is, it may be rotated in either direction. The shaft 22 is provided with one of the meshed beveled gears 25, the other beveled gear being secured to an accurate master lead screw 26. A nut 27 carried by the lead screw 26 controls the longitudinal motions of the longitudinal slide 28 of the tool-holder of the attachment.

The set of interchangeable variable speed gear wheels 18, 18a, 18b, 18c rotates the shaft 20 rather slowly which in turn, through clutch 23 and shaft 22, causes the lead screw 26 to rotate at a low speed and to advance longitudinal slide 28 slowly during the working stroke. The set of variable speed gears, 19, 19a, 19b, 19c, 19d on the other hand are designed to produce a rapid rotation of the lead screw 26 for controlling the idle quick return motion of the slide 28.

A cross slide 29 is operated by a cam 30 fixed on the cam shaft 4. A roller 31 rolls on this cam and its motion is transmitted through rods to a toothed sector 32 in mesh with a rack 33 located within the support 3. This rack is fitted with a pin 35 (Fig. 5) penetrating into an opening 36 of a flat piece 34 mounted into a slide of the carriage 29. This flat piece 34 can be displaced axially as a flat bolt, so that the pin 35 rests either on the part 36a (released position of the tool) or on the part 36b (working position of the tool).

The nut 27 operates the slide 28 by the intermediary of adjustable transmission elements, which permits one to modify the transmission ratio of the motions between the nut 27 and the said slide.

To this effect, the nut 27 is fastened on a slide 40 sliding in a slot 41 of the frame 1. The motion of this slide 40 is at right angles to the motion of the longitudinal slide 28. The slide 40 bears a guide 42 which can be angularly adjusted (Figs. 4 and 6) and is provided with an inclined plane formed by one of the edges of a slot 42a in which a finger 43 disposed on one end of a rod 44 is adapted to slide. The rod 44 is provided with a guide 44a formed in frame 1 and has its other end connected to the longitudinal slide 28. Thus it is seen that the rod 44 moves axially in a direction parallel to the motion axis of the longitudinal slide 28. The guide 42 is mounted on the slide 40 by means of two screws 45 which traverse arcuate slots 45a formed in the guide and may be rotated and secured on the slide when the proper angle of inclination of the slot 42a has been reached with respect to the rod 44.

The threaded holes formed in the slide 40 and intended to receive the screws 45 are arranged on a straight line disposed at an angle of 90° with respect to the motion axis of the slide 40.

The arcuate slots 45a are arranged symmetrically with respect to the slot 42a and have an angular length of about 90°.

Adjustable stops 46 and 47 mounted on the slide 40 are intended to operate a pivoted lever 48 which is connected with the flat piece 34 in order to start the engaging of the tool at the end of the return stroke and disengage the tool from the work at the end of the working stroke.

An adjustable stop 49 mounted on the slide 40 is provided to effect a change in the rotation direction of the lead screw at the end of the working stroke of the tool. In carrying out this operation the stop 49 acts on a lever 50 which pivots so as to disengage the clutch 23 and causing the engagement of the clutch 24.

Adjustable stops 51 and 51a, also mounted on the slide 40, are intended to operate so as to reverse the rotation motion of the lead screw 26 at the end of the return stroke of the tool as well as to automatically stop the device when the screw-thread cutting operation has been completed.

To serve this purpose, the stop 51 acts at the end of the return stroke on a lever 52, in such a way as to cause the clutch 24 to be disengaged and simultaneously therewith effecting the engagement of the clutch 23.

At the end of each return stroke, the stop 51a acts on a lever 55 which, through a set of rods acts on a lever 56 by means of certain linkage. The extremity of this lever 56 thrusts against a pin 56a fixed on the lever 12. At each return of the slide 28 to the starting working position, the lever 56 is released from the pin 56a. However, the coupling 14 cannot be released since the lever 12 is still maintained in position by the lever 8.

During the return of the tool to its initial working position, after each run, the cam 30 moves the cross slide 29 in the direction of the work spindle so that, when the tool engages the work, the tool cuts out a chip.

During the last return stroke of the tool when a given piece of work has been completed, the cam face 10a thrusts against the finger 7 and moves the lever 8 to the position shown in Figure 2 of the drawings. It is now seen that the adjustable stop 11 rests no longer on the extremity of the lever 12. Thus, when the stop 51a operates the lever 56 and releases its recessed end from engagement with the pin 56a, the lever 12 is completely released and is brought, under the action of a spring (not shown), to the position illustrated in the drawings (Fig. 2). The displacement of the lever 12 disengages the clutch 14 which stops the operation of the whole attachment including lead screw 26.

It is clear that the locking of the lever 12 by the pin 56a and the lever 56 might be omitted, the device then being stopped by the action of the cam face 10a at the end of the return stroke of the longitudinal slide 28. It is in this case, however, difficult to obtain a correct position for this slide in order to start work on the succeeding work piece.

The sets of gear wheels arranged between the work spindle 17a bearing the work piece and the shaft 20 are interchangeable so as to enable one to select a ratio of the speeds of these two shafts which is approximately equal to the ratio existing between the pitch of the lead screw and the pitch of the screw thread to be cut. By adjusting the angle of inclination of the slot 42a formed in the guide 42 it is possible to modify the ratio of movement of the nut 27 in mesh with the lead screw 26 and the movement of the longitudinal carriage 28. This correction eliminates any error of pitch due to the ratio of the rotation speeds of the work spindle 17a and of the shaft 20 as determined by the gears, which, for some screw threads, cannot be made equal to the ratio of the pitches.

As discussed above, the guide 42 may be rotated in such a manner as to move the slot 42a from a right angle position with respect to the motion-axis of the rod 44 to a position parallel to this axis. It is clear, however, that both these extreme positions are not actually used; however, it is interesting to note that, for the orientations practically used, that is, included within an inclination of 45° and the right angle position with respect to the motion-axis of the rod 44, the motion ratio is smaller than unity; consequently, by choosing a speed ratio between the spindle 17a and the shaft 20 equal to a multiple of the ratio between the pitch of the leadscrew and the screw thread to be obtained, and by properly orienting the guide 42, it is possible to reduce in the same proportion the thrust of the nut 27 on the lead screw during the working application of the tool, and thus to reduce the wear of the lead-screw.

Finally, as appears from Fig. 6, the guide 42 can be tilted to 45° on either side of the perpendicular to the motion of the pushing rod 44. Thus, by simply changing the position of the guide, it is possible to reverse the displacement direction of the slide 28. This is quite advantageous as it is possible to cut the same screw thread by revolving the spindle in either direction. To maintain unchanged the direction of movement of the nut 27, it is necessary only to insert or to remove one supplementary gear wheel between the wheels 17 and 16, depending on the rotation direction of the spindle.

This fact confers on the lathe a much wider working range, as it is now no longer necessary to maintain one rotation direction for the work spindle in order to cut a right hand or a left hand screw thread, and it is also possible to operate simultaneously with the screw thread cutting tool, cutting off, bearing work, or other operations.

One of the features shown in Fig. 2 has some inconveniences. For example, when the stop 51 acts on lever 52, it is possible that, after the releasing of the cone coupling 24, the inertia of the parts in rotation might not be sufficient to produce a meshing of both parts of the clawclutch 23.

In order to eliminate this defect, a device having quick snap motion in both displacement directions may be employed and controlled by the stops 51 and 49. In such devices, an element controlling the couplings is usually submitted to the action of an auxiliary relay comprising, generally speaking, springs. These latter may be put under tension, for example, by the stop 51, and a bolt employed to keep the controlling element of the clutches in one of their positions. At the end of the stroke, the stop 51 can release this element, under the action of the relay, which causes the releasing of one of the clutches, and the engagement of the other one.

Such a device is shown in Fig. 3. The lever 52 is pivoted on a pin 60, fastened on the bed 1 and bears two arms 52a and 52b. On the pin 60 an element, controlling the clutches, is pivoted. The element consists of a lever 61, one arm of which is disposed between the arms 52a and 52b. This lever 61 is fitted with a pin 62 intended to work with a double bolt comprising the two hooks 63a and 63b pivoted on a fixed part 64a and 64b. These are connected together by a spring 65, which tends to maintain the hooks downward, that is in contact with the pin 62.

The other end of this lever 61 is bifurcated. On each arm of this bifurcated end, are pivoted levers 66, each of which bears a finger 67 penetrating into a groove 68 of a bushing 69, the bushing being fastened to the female parts of the clutches 23 and 24. Rods 70, adjustable in length, are provided in order that the proper operating distance may be obtained between the levers 66 and the arms of the bifurcated lever 61. These rods 70 are rigidly fixed to the levers 66 and slide in openings formed in the ends of the arms of lever 61. Nuts 71 are provided to adjust the length of the rods and to carry the levers 66 for the releasing of the cone-coupling 24. Springs 72 tend to maintain the maximum distance between the extremity of the arms of the lever 61 and the extremities of the levers 66. Each arm 52a and 52b is fitted on its extremity with a finger 75a—75b which latter is submitted to the action of a compression spring located in a bushing 73a—73b. Each of these arms bears, furthermore, an adjustable stop 74a—74b, intended to release lever 61 by thrusting against the hooks 63a and 63b in order to compel them to oscillate at the required moment, against the action of a spring 65.

This device works as follows:

The lever 52 is controlled either by the stop 51 at the end of the return stroke, or by the stop 49 at the end of the working stroke, the lever 50 being omitted.

In the position shown in Fig. 3, the clutch 23 is in engaged position; the tool makes, therefore, a working run. Somewhat before the end of the working run, the stop 49 acts under the lever 52 and tends to oscillate it in a counterclockwise direction. The finger 75a thrusts against the lever 61, and the action of the stop compresses the spring located within the bushing 73a. At the end of the working stroke, the stop 74a rocks the hook 63a which is in contact with the pin 62. This oscillation causes the hook 63a to release the pin 62 and effects the release of the lever 61. The lever 61 then rotates in a counterclockwise direction under the action of the spring located within the bushing 75a. The rotation of the lever 61 releases the claw-clutch 23 and causes the engagement of the clutch 24. The male and female parts of the clutch 24 are brought in contact with each other by means of the spring 72, the lever 61 being maintained in position by the hook 63b in contact with the pin 62. At the end of the return stroke, the stop 51 acting on the lever 52 produces the reverse motion. The levers 66, instead of being pushed by the springs 72, are pulled by the rods 70.

It appears that, due to the elastic connection between the levers 61 and the levers 66, it is possible to adjust very easily the specific pressure of the cone-coupling, so as to obtain a positive carry of the shaft 22. Moreover, this elastic connection will compensate for the wear of the coupling and confers therefore to the whole device a great working reliability.

In the embodiment according to Fig. 7, the device for the lathe has been designed as a turning off contrivance.

This device is, of course, very much simpler than the one shown in Fig. 1, because in this case, all the necessary controlling elements for cutting out the screw thread by several runs, can be omitted.

The frame 1 is fixed on the lathe by means of the screws 2. This frame is fitted with a groove 41 in which a carriage 40 slides, this latter carrying the orientably adjustable guide 42. The motions of this carriage are controlled by a flat cam 80 fixed on the cam shaft 4. This cam 80 has a spiral profile on which rolls a roller 81, the motions of which are transmitted to the carriage 40 by means of a set of rods controlling a toothed sector 82 in mesh with a rack 83 on the carriage 40.

As in the embodiment described above, the slide 28 is controlled by the rod 44, the finger 43 of which is fixed at its extremity and penetrates into the groove 42a of the guide 42.

Similarly the slide 29 is controlled by a cam 84 the circular profile of which is traversed by the roller 31 connected by a set of rods to the toothed sector 32 in mesh with the rack 33. This latter is fixed on the slide 29, the flat rod 34 being omitted.

Two forms of embodiment of the device, object of this invention, have been described as examples; it is however clear that other modifications may be devised without departing from the spirit and scope of this invention.

As a particular case, in screw cutting apparatus, it is possible to control the front tool-holder of a turret lathe, by known means. However, the embodiment described with reference to Figs. 1 and 2, in which the contrivance is fitted with its own tool-holder, presents great advantages. In fact, due to this arrangement, it is possible to operate a cutting-off and at least one screw-cutting operation on the same workpiece, without necessitating any re-setting operation. Thus great losses of time due to the re-setting operation are eliminated, and the working errors arising from an unsatisfactory centering of the workpiece during re-setting operation are obviated.

Figure 8:
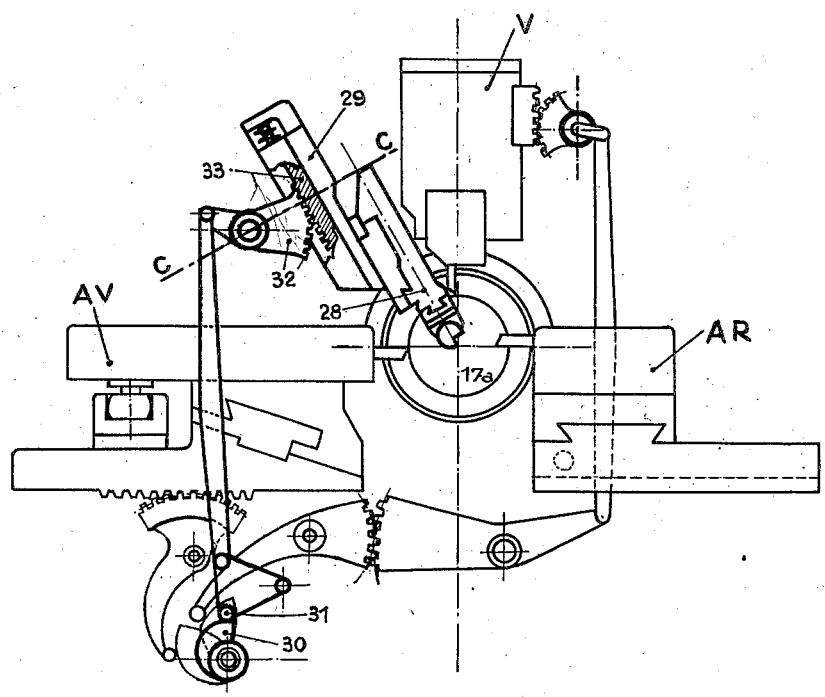
Fig. 8 is a view showing the arrangement of the slide bearing the tool-holder with respect to the spindle and to the other tool-holders of the lathe.

As shown in Fig. 8, the auxiliary tool-holder is disposed in such a way that, when the device is attached to the lathe, the tool-holder is arranged radially with regard to the spindle of the lathe, in a plane which is at an angle with respect to the horizontal plane of the front and rear tool-holders AV and AR.

The inclination and the arrangement of the tool-holder with respect to the other tool-holders of the lathe are designed in such a way as to allow the simultaneous use of this auxiliary tool-holder with any one of the regular tool-holders of the lathe itself.

The controls of the auxiliary tool-holder being completely independent of the controls of the other regular tool-holders, the setting in working position and the releasing of the tool as well as the starting and the stopping of the working operation can be controlled as desired within the cycle of the various working operations of the workpiece.

It is to be noted (Fig. 1) that the stopping of the device is controlled by the carriage 40 when the longitudinal slide 28 of the tool-holder reaches its longitudinal work starting position for the work stroke. This fact has the advantage that in its rest position, the tool is ready in its longitudinal position with regard to the spindle for starting the work on the next workpiece. Moreover, the cam 30 controls the return of the cross slide to its rest position, as soon as the working operation is completed. Consequently, in its rest position, the tool-holder is withdrawn and does not in the least interfere with the motions of the regular front and rear tool-holders AV and AR of the lathe, or with those of the vertical tool-holder or of those of the turret (not shown).

It is quite clear that the device shown in Fig. 1 which is especially designed for the cutting of screw threads, can also be used for a cutting-off or a traversing operation. In fact, it is sufficient to provide for the stopping of the contrivance after the first return of the slide 28 to its starting working position. This is easily obtainable by properly setting the angular position of the cams 10 and 10a of the cam 5. The feed speed of the tool, which, in this case must be smaller, can be adjusted either by means of the angular setting of the guide 42, or by the selection of variable speed gear wheels 18. Finally, the cam 30 becomes, in this case, a cam with circular periphery, the active circumferential length of which is detemined in the usual way for each special case.

In the embodiment shown in Fig. 7 for cutting-off, the cross slide 29 and the longitudinal slide 28 of a tool-holder are controlled by means of two flat cams arranged on the same cam shaft. It is clear that it is preferable to arrange these cams on the longitudinal cam shaft of the lathe, which is very accessible, so that the angular setting and the adjustment of the cams can be accomplished very quickly. In order to eliminate the necessity of changing the cam 80, an adjustable rod may be provided, the length of it determining the active length of the cam. The feed speed, however, can be set by the angular setting of the guide 42 with regard to the linear motion of the rod 44.

Further, the cam 30 may comprise two similar segments with circular peripheries, the relative angular setting of which may be adjustable exactly as required, so as to obtain an easy and quick setting of the active circumferential length of the cam.

It is clear that the device, which is the object of the present invention, can be used also as a device fixed in position. In this case the frame I would be made of one piece; that is, for example, integrally with the bed of the lathe.

It will be apparent that I have provided an attachment for an automatic lathe which presents substantial important advantages over the prior art. It will be obvious to those skilled in the art that modifications and adaptations of my invention may be made to meet particular conditions, and all such modifications and adaptations which are comprehended within the scope of the appended claims, I consider to be a part of my invention.

I claim:

1. In a screw-threading attachment for an automatic lathe having a work spindle and including a bed, a lead screw, an auxiliary tool holder, a longitudinal slide and a radial slide for slidably mounting said tool holder adjacent said work spindle and moving said holder respectively parallel or perpendicular with reference to said spindle, means driven by said work spindle for driving said lead screw, displaceable lead nut means mounted on said lead screw for displacement thereby, said lead screw being positioned to displace said lead nut means at an angle to the direction of motion of said longitudinal slide, and infinitely adjustable mechanical movement transmission means interposed between said lead nut means and said longitudinal slide and adapted to infinitely adjust the ratio of the displacement of said longitudinal slide to the initiating displacement of said lead nut means.

2. An attachment as set forth in claim 1, said transmission means being adapted to change the algebraic sign of said ratio as well as its magnitude and to reverse the direction of the working stroke of said tool holder carried on said longitudinal slide for the same direction of rotation of said lead screw.

3. An attachment as set forth in claim 1, said transmission means comprising a guide member having a slot, a supporting element carried by said lead nut means, means for adjustably orientably mounting said guide member on said supporting element with said slot oriented in a desired direction, and pin means carried by said longitudinal slide and slidably engaged in said slot.

4. An attachment as set forth in claim 1, said transmission means comprising a guide member having a slot, a supporting element carried by said lead nut means, guideway means mounted on said bed for guiding the movement of said supporting element, means for adjustably orientably mounting said guide member on said supporting element with said slot oriented in a desired direction, and pin means carried by said longitudinal slide and slidably engaged in said slot.

5. An attachment as set forth in claim 1, said means driven by said work spindle for driving said lead screw comprising a set of interchangeable gears which can be varied in number and in movement transmission ratio for varying in desired manner the direction or the magnitude of movement of said lead screw caused by a given movement of said work spindle.

6. An attachment as set forth in claim 1, said means driven by said work spindle for driving said lead screw comprising means actuated by movement of said nut means to its terminal positions to drive said lead screw slowly during the work stroke in one direction and to drive said lead screw fast during the idle return stroke in the opposite direction and to return said auxiliary tool holder to starting position as soon as the work stroke has been completed.

7. An attachment as set forth in claim 1, and cam means actuatable by the return of said lead nut means to its initial starting position upon completion of work for disconnecting said means driven by said work spindle for driving said lead screw and thereby stopping said lead screw and said longitudinal slide.

ERNEST BODMER.